United States Patent [19]

Lin

[11] Patent Number: 6,042,274
[45] Date of Patent: Mar. 28, 2000

[54] AXLE AND BALL BEARING ARRANGEMENT

[76] Inventor: Wen-Hwa Lin, No. 812, Chang Shen Rd., Tian San Chun, Wei Pu Hsiang, Taichung Hsien, Taiwan

[21] Appl. No.: 09/217,067

[22] Filed: Dec. 21, 1998

[51] Int. Cl.[7] .................................................. F16C 19/08
[52] U.S. Cl. ........................................ 384/545; 384/458
[58] Field of Search .................................. 384/458, 545; 74/594.1, 594.2

[56] References Cited

U.S. PATENT DOCUMENTS 5,509,739  4/1996  Chi ............................................ 384/458
5,575,540  11/1996  Chi ...................................... 384/545 X
5,634,727  6/1997  Lin et al. ............................ 74/594.1 X

*Primary Examiner*—Thomas R. Hannon
*Attorney, Agent, or Firm*—Dougherty & Troxell

[57] ABSTRACT

An annular locating member mounted around a bottom bracket bearing axle within a ball race to hold steel balls inside the ball race around the bottom bracket bearing axle between a flange around the periphery of the bottom bracket bearing axle and a flange around the inside wall of the ball race, the annular locating member having an outward flange coupled to an annular groove inside the ball race and an inward flange coupled to an annular groove around the periphery of the flange at the bottom bracket bearing axle.

1 Claim, 5 Drawing Sheets

1

AXLE AND BALL BEARING ARRANGEMENT

BACKGROUND AND SUMMARY OF THE INVENTION

The Present invention relates to an axle and ball bearing arrangement for bicycle, and more particularly to such an axle and ball bearing arrangement that can be quickly installed in a bottom bracket for a bicycle.

Ball bearing means are intensively used in bicycles to support rotary members. FIG. 1 shows steel balls arranged in holes in a ball cup. When the ball cup is installed in a bottom bracket to support a bottom bracket bearing axle, the steel balls are disposed in contact with the periphery of the bottom bracket bearing axle. Because the steel balls can only be rotated in the respective holes in the ball cup, the bottom bracket bearing axle receives much resisting force from the steel balls when rotated. Further, the installation of the steel balls and the ball cup consumes much labor. FIG. 2 illustrates an axle and ball bearing arrangement installed in a bicycle's bottom bracket according to the prior art. This arrangement comprises a bottom bracket bearing axle having a locating flange raised around the periphery, a ball race fastened to a bottom bracket to hold a plurality of steel balls on the inside around the bottom bracket bearing axle between the locating flange of the bottom bracket bearing axle and an inside annular flange inside said ball race, and a plastic annular insert fastened to the ball race around the bottom bracket bearing axle to hold the steel balls in place. This arrangement has drawbacks. One drawback of this arrangement is that lubricating grease tends to leak out of the ball race. Another drawback of this arrangement is that the plastic annular insert wears quickly with use. When the plastic annular insert starts to wear, the steel balls may be vibrated when rotated. Furthermore, because the steel balls are separately packed, much time is wasted in assembling the transmission system during the assembly process of the bicycle.

This present invention has been accomplished to provide an axle and ball bearing arrangement which eliminates the aforesaid drawbacks. According to one aspect of the present invention, a annular locating member is mounted around a bottom bracket bearing axle within a ball race to hold steel balls inside the ball race around the bottom bracket bearing axle between a flange around the periphery of the bottom bracket bearing axle and a flange around the inside wall of the ball race, and a dust cap is fastened to the ball race at one side opposite to the annular locating member. Because the steel balls are received in an enclosed space, no lubricating grease will leak out. Because the bottom bracket bearing axle, the annular locating member, the steel balls, the ball race and the dust cap are assembled together at the factory, bicycle assembly process can efficiently be Processed.

DETAILED DESCRIPTION OF THE PREFERRED EMBODIMENT

Figure 1:
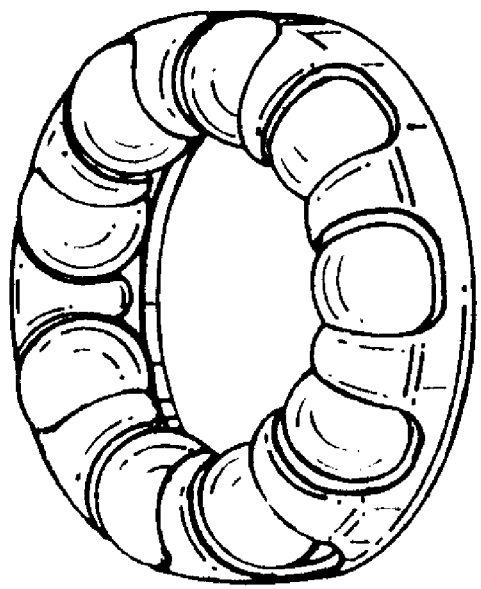
FIG. 1 shows steel balls arranged in a ball cup according to the prior art.
Figure 2:
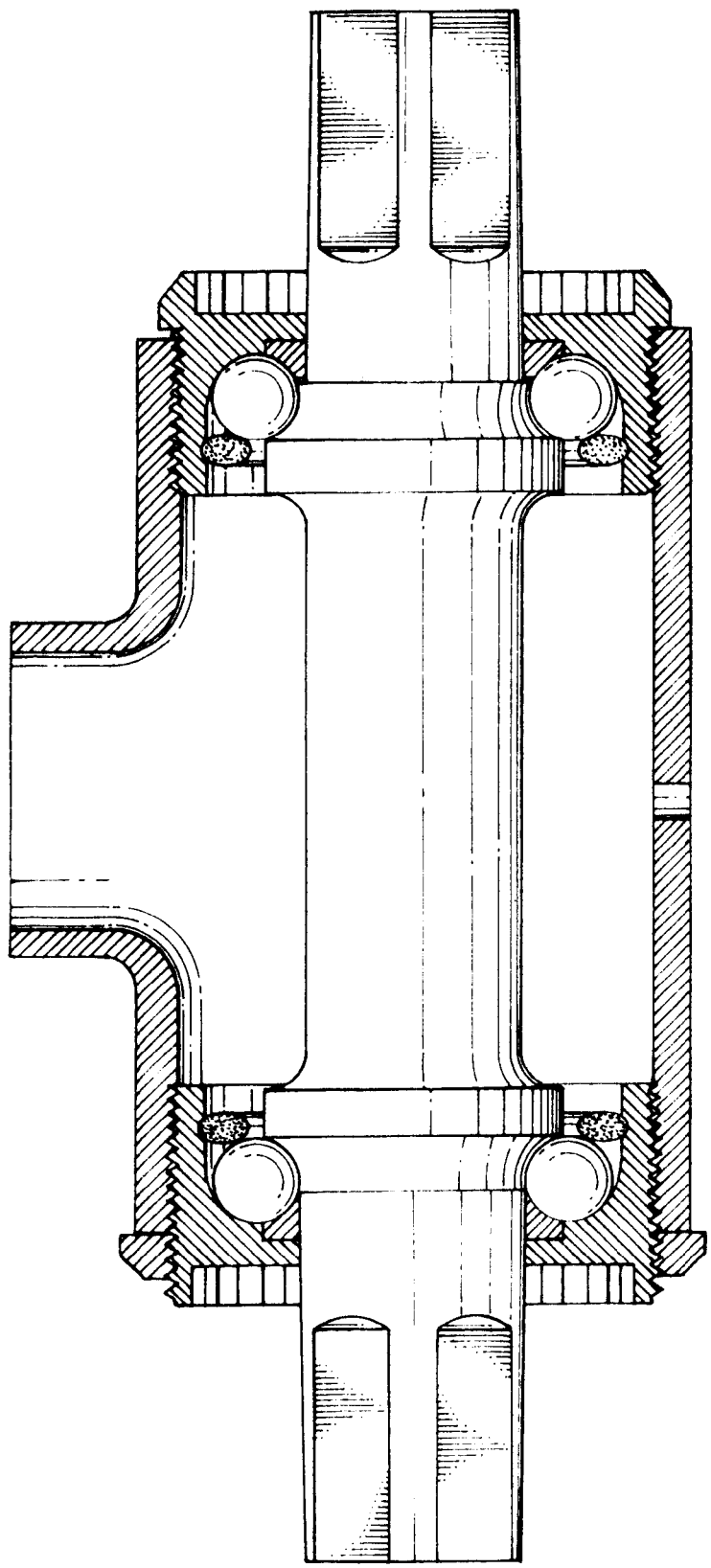
FIG. 2 illustrates an axle and ball bearing arrangement installed in a bicycle's bottom bracket according to the prior art.
Figure 3:
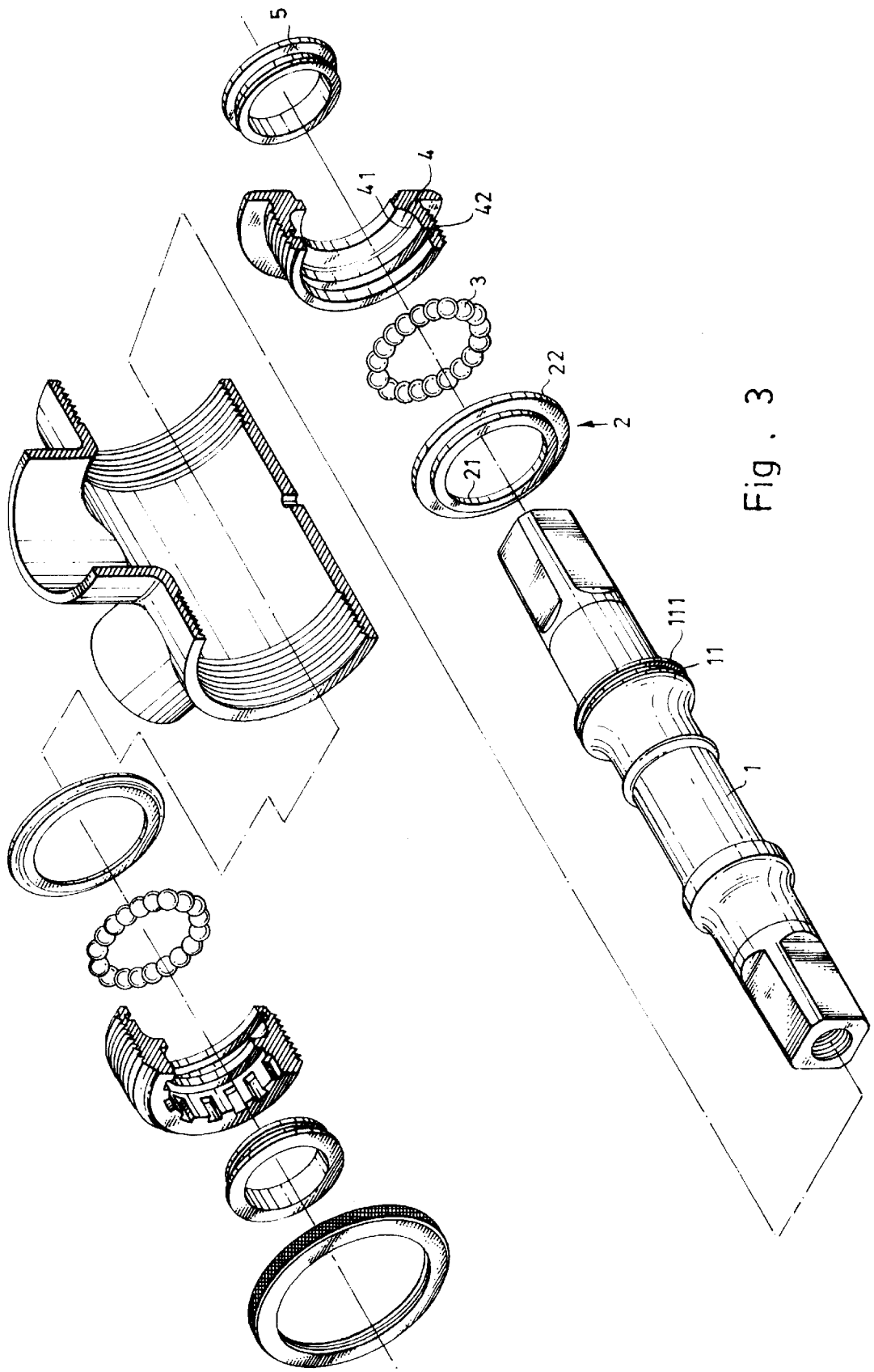
FIG. 3 is an exploded view of the present invention.
Figure 4:
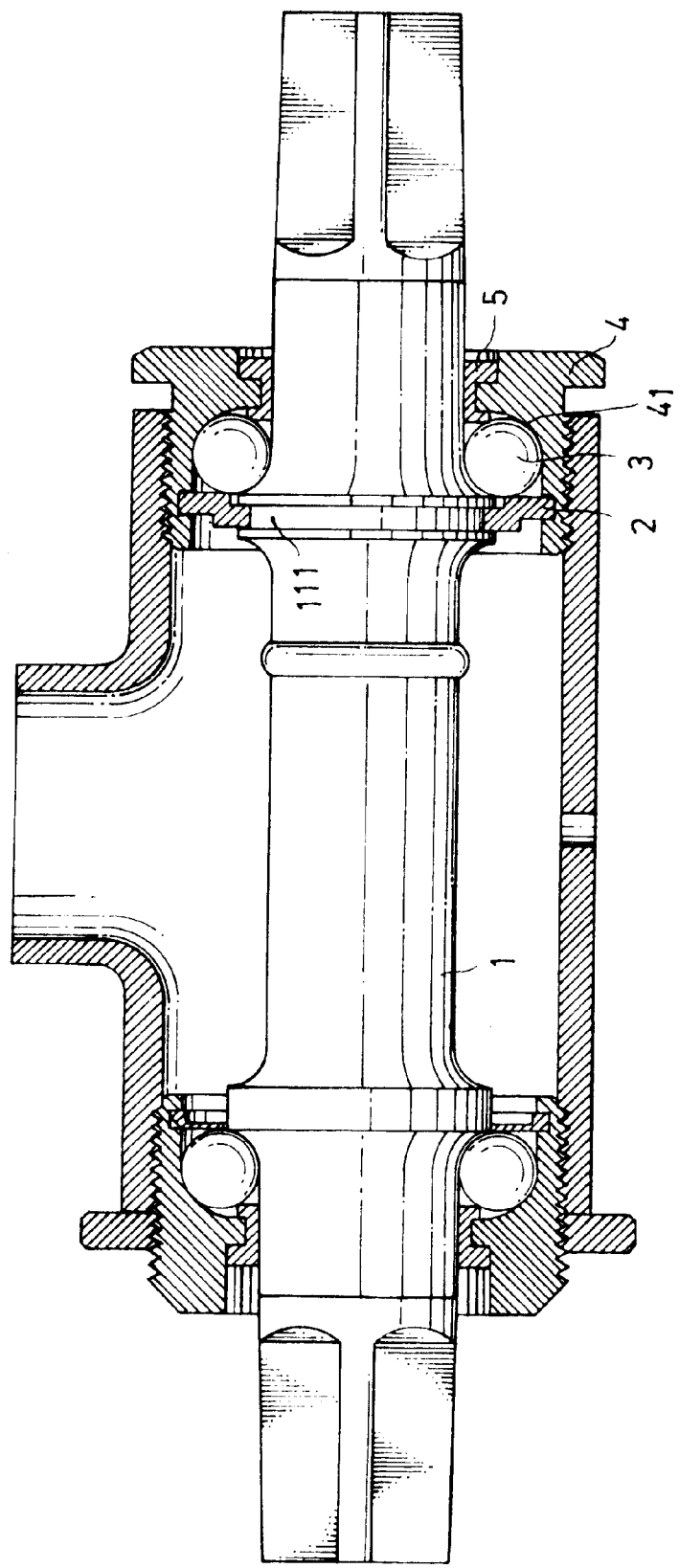
FIG. 4 is a sectional assembly view of FIG. 3.

Referring to FIGS. 3 and 4, an axle and ball bearing arrangement in accordance with the present invention is generally comprised of a bottom bracket bearing axle 1, an annular locating member 2, a plurality of steel balls 3, a ball race 4, and a dust cap 5.

The bottom bracket bearing axle 1 comprises a flange 11 raised around the periphery thereof on the middle, and an annular groove 111 around the periphery of the flange 11. The ball race 4 is fixedly fastened to a bicycle's bottom bracket to hold the steel balls 3 on the inside around the bottom bracket bearing axle 1, having an inside annular flange 41 and an inside annular groove 42 disposed around the inside wall thereof. The steel balls 3 are arranged inside the ball race 4 around the bottom bracket bearing axle 1, and revolvably retained between the inside annular flange 41 of the ball race 4 and the flange of the bottom bracket bearing axle 1. The annular locating member 2 is coupled between the bottom bracket bearing axle 1 and the ball race 4 to hold the steel balls 3 inside the ball race 4, having an inward coupling flange 21 inserted into the annular groove 111 at the flange 11 of the bottom bracket bearing axle 1 and an outward coupling flange 22 inserted into the inside annular groove 42 of the ball race 4. The dust cap 5 is mounted around the bottom bracket bearing axle 1, and fastened to the ball race 4.

Because the annular locating member 2 is coupled between the ball race 4 and the bottom bracket bearing axle 1 to hold the steel balls 3 in place, the bottom bracket bearing axle 1 is positively supported on the steel balls 3 inside the ball race 4, and can smoothly be rotated without causing a displacement. Because the annular locating member 2 and the dust cap 5 are fastened to the ball race 4 at two opposite side around the bottom bracket bearing axle 1 to hold the steel balls 3 inside the ball race 4, an enclosed space is defined within the ball race 4 around the steel balls 3 to prevent a leakage of lubricating grease. Furthermore, because the bottom bracket bearing axle 1, the annular locating member 2, the steel balls 3, the ball race 4 and the dust cap 5 are assembled together at the factory, bicycle assembly process can efficiently be proceeded.

Figure 5:
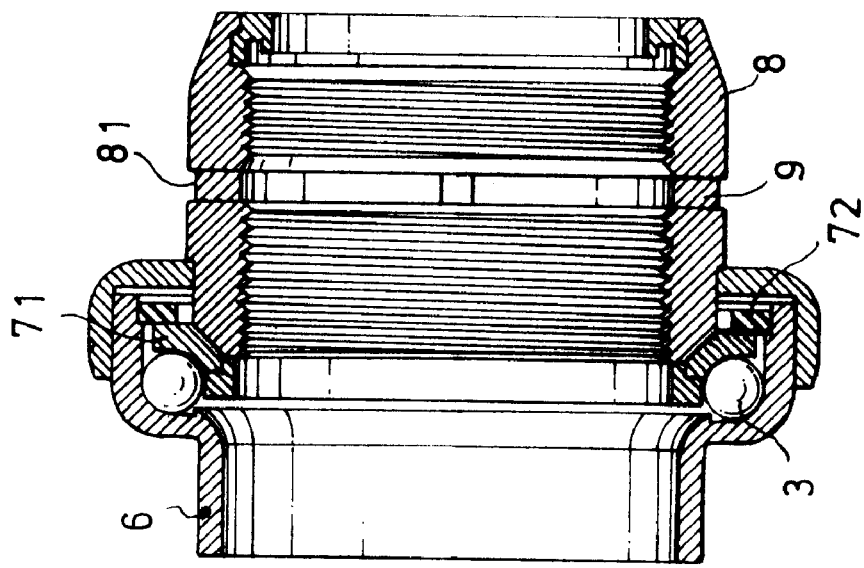
FIG. 5 shows an extended application of the present invention.

FIG. 5 shows another application of the present invention, in which steel balls 3, an annular insert 71 and a rubber ring 72 are mounted in one end of a bicycle head tube 6, and a cap 8 is installed to hold the steel balls 3, the annular insert 71 and the rubber ring 72 in place. The cap 8 has an annular groove 81 around the periphery thereof. A C-shaped clamp 9 is fastened to the annular groove 81.

I claim:

1. An axle and ball bearing arrangement comprising a bottom bracket bearing axle, said bottom bracket bearing axle having a locating flange raised around the periphery thereof, a ball race fastened to a bottom bracket to hold a plurality of steel balls on the inside around said bottom bracket bearing axle between the locating flange of said bottom bracket bearing axle and an inside annular flange inside said ball race, and a dust cap fastened to said ball race at one side around said bottom bracket bearing axle, wherein the locating flange of said bottom bracket bearing axle has an annular groove around the periphery thereof, said ball race has an annular groove around an inside wall thereof, and an annular locating member is coupled between said bottom bracket bearing axle and said ball race to hold said steel balls inside said ball race, said annular locating member having an inward coupling flange coupled to into the annular groove at the flange of said bottom bracket bearing axle and an outward coupling flange coupled to the inside annular groove of said ball race.

* * * * *